United States Patent

Lavallee

[15] 3,644,001
[45] Feb. 22, 1972

[54] EMERGENCY WHEEL

[72] Inventor: Robert Lavallee, 2131 Chapdelaine Apt. 10, Quebec, 10 Quebec, Canada

[22] Filed: Feb. 17, 1970

[21] Appl. No.: 12,100

[52] U.S. Cl. ........................................................ 301/38 S
[51] Int. Cl. .................................................... B60b 11/00
[58] Field of Search ........................... 301/38, 38 S, 36, 39

[56] References Cited

UNITED STATES PATENTS

| | | | |
|---|---|---|---|
| 2,466,794 | 4/1949 | Craig | 301/38 |
| 2,535,567 | 12/1950 | Craig | 301/38 S |
| 2,863,703 | 12/1958 | Null | 301/38 S |

Primary Examiner—Richard J. Johnson
Attorney—Raymond A. Robic

[57] ABSTRACT

An emergency wheel comprising an outer disc carrying a tire and an inner disc adapted for concentric attachment to the regular wheel of a vehicle. Both discs are rotatably joined by eccentrically and obliquely disposed mating portions, causing the outer disc to shift from a position eccentric and oblique with respect to the regular wheel of the vehicle, to a position concentric with and parallel to the regular wheel and closely encircling the same. Means are also provided for securing the inner disc with respect to the outer disc when shifted to such concentric and parallel position.

13 Claims, 10 Drawing Figures

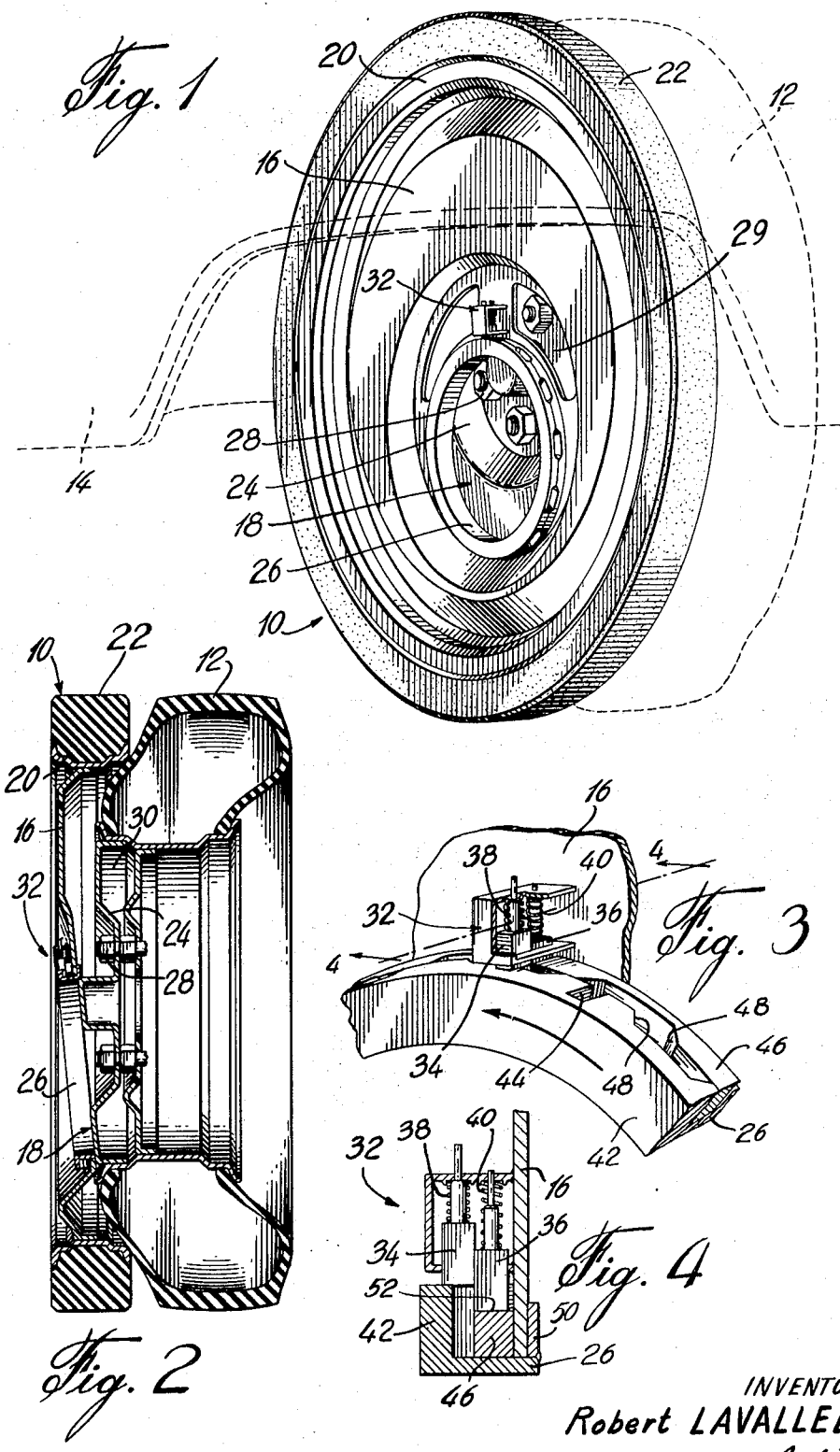

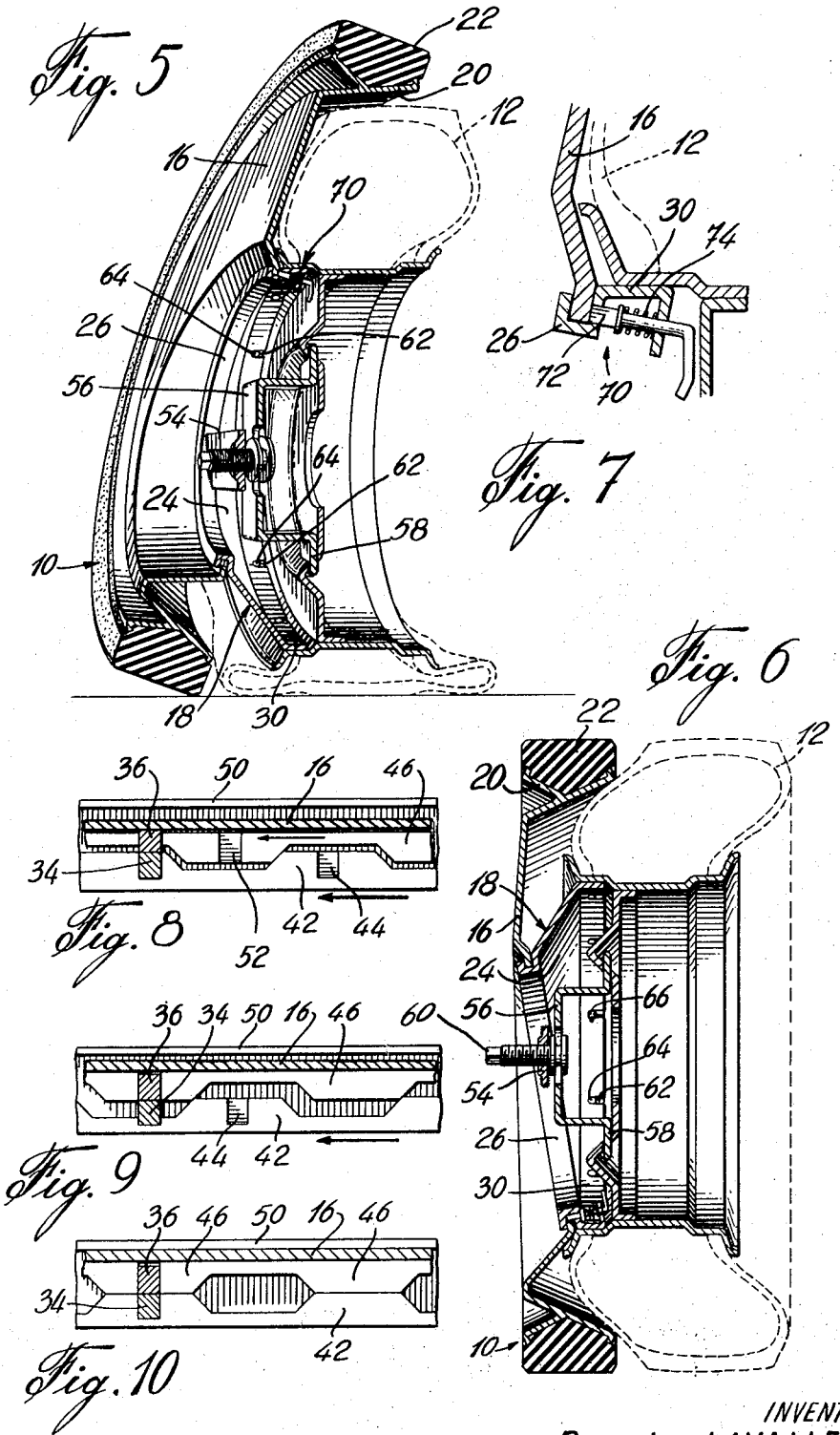

EMERGENCY WHEEL

The invention relates to an emergency wheel for use with the regular wheel of a motor vehicle when a tire of such regular wheel is punctured.

It is common practice to provide all motor vehicles with a spare wheel and with the usual tire changing equipment. However, everyone knows that tire changing is a dirty and time-consuming job.

Emergency wheels which may be assembled on the regular wheels of a motor vehicle have been provided in the prior art for releaving the problem of tire changing. Examples of such prior art devices may be found, for example, in U.S. Pat. No. 1,886,977 issued Nov. 8, 1962 and U.S. Pat. No. 2,220,518 issued Nov. 5, 1940. However, the prior art devices have proven not to be practical enough, being either of a type of construction not allowing enough rigidity of assembly, or too bulky to be installed under the fender of a motor vehicle. Consequently, their use has never been accepted by car manufacturers.

It is the object of the present invention to provide an emergency wheel which may be easily attached to the regular wheel of a motor vehicle and yet will be devoid of the shortcomings of the prior art devices.

It is also an object of the invention to provide an emergency wheel which, when installed on a wheel having a punctured tire, will easily clear the vehicle fender and will not bear or run on the flattened portion of the punctured tire when the vehicle is started with the emergency wheel on.

It is a further object of the invention to provide an emergency wheel which will push the punctured tire in the axial direction during assembly and closely encircled the regular wheel, so as to reduce the axial space taken by the assembly of the emergency and regular wheels thus permitting the use of such emergency wheel under the fender of most vehicles.

The emergency wheel, in accordance with the invention, comprises an outer disc carrying a tire, an inner disc adapted for concentric attachment to the regular wheel of a vehicle, both discs being rotatably joined by excentrically disposed mating portions causing the outer disc to shift from a position eccentric with respect to the regular wheel a position concentric to the regular wheel, and means for securing said inner disc with respect to said outer disc when shifted to said concentric position.

In a preferred embodiment of the invention, both discs are rotatably joined by eccentrically and obliquely disposed mating portions causing the outer disc to shift from a position eccentric and oblique with respect to the regular wheel of the vehicle to a position concentric with and parallel to the regular wheel. Such an embodiment permits an easier installation of the emergency wheel as it will be explained later on in the description.

The inner disc comprises two eccentric portions, the first one of which is adapted to be secured concentrically to the regular wheel, and the second one of which is adapted to be rotatably joined with a corresponding portion of the outer disc. The second portion of said inner disc is to be disposed at an angle with respect to said first portion so as to permit the upper portion of the emergency wheel to clear the fender apron, and to prevent the lower portion of the same wheel in contact with the ground from bearing on the flattened portion of the punctured tire when the vehicle is started with the emergency wheel on.

The outer disc comprises two eccentric portions, the first one of which is of larger diameter and carries a rim and a tire, and the second one of which is of smaller diameter and adapted to be rotatably joined with the aforementioned corresponding second portion of the inner disc. Said second portion of the outer disc is to be disposed at a suitable angle with respect to the first portion, so that, in the first phase of assembly, it will increase the inclination on the outer disc with respect to the regular wheel, and that in the second phase of assembly, after a relative movement of 180° of the two discs, the two angles will cancel each other and make the outer disc generally parallel to the regular wheel.

The two mating portions of said discs are to be rotatably joined by a hollow annular pivot to give permanent access to means for securing the emergency wheel to the regular wheel and are to be disposed so that, in the first phase of assembly, the lower portion of the emergency wheel will protrude outwardly (from the center of the vehicle) and the upper portion will largely overlap the regular wheel, and after a relative rotation of 180° the emergency wheel will completely encircle and overlap the outer rim of the regular wheel.

The emergency wheel is to be provided with means for rotatably and axially securing the same to the regular wheel, and also with means for pushing the punctured tire inwardly (toward the center of the vehicle) during assembly to reduce the axial space taken by the assembly thus permitting the use of such emergency wheel with most vehicles.

The inner disc is provided at its outer edge with an annular ring so as to bring additional rigidity to the assembly and to relieve the securing means of all radial loads by closely fitting inside the outer rim of the regular wheel.

The invention will now be disclosed with reference to the accompanying drawings which illustrate preferred embodiments of the invention and in which:

FIG. 1 illustrates a perspective view of an emergency wheel assembled to the regular wheel of a vehicle;

FIG. 2 illustrates a section view through the central axis of the assembly of FIG. 1;

FIG. 3 illustrates an enlarged perspective view of a locking device illustrated in FIG. 1;

FIG. 4 illustrates a section view along line 4—4 of FIG. 3;

FIGS. 5 and 6 illustrate section views of a further embodiment of an emergency wheel before and after assembly on a regular wheel;

FIG. 7 illustrates an enlarged view of a locking device shown in FIG. 5; and

FIGS. 8 to 10 illustrate the operation of the locking device used in FIGS. 1 to 4 of the drawings.

Referring to FIGS. 1 and 2, there is shown an emergency wheel 10 assembled on a regular wheel 12 under the fender 14 of a motor vehicle. Emergency wheel 10 comprises an outer disc 16 and an inner disc 18 eccentrically and obliquely mounted for rotation with respect to outer disc 16.

A rim 20 is secured to the outer edge of outer disc 16 and carries a solid tire 22. It is to be understood that a pneumatic tire could also be used in place of solid tire 22.

The inner disc 18 comprises two eccentric portions 24 and 26. The first portion 24 is adapted to be secured to the regular wheel of vehicle using the regular bolts holding such regular wheel and additional nuts 28. The second portion 26 is at an angle with respect to the first portion 24 for a purpose which will be disclosed later. Suitable apertures 29 are provided where necessary in outer disc 16 for gaining access to the bolts. The outer edge of the first portion 24 of inner disc 18 is turned in to form an annular ring 30 having an outer diameter approximately equal to the inner diameter of the rim of the regular wheel. Annular ring 30 fits into the rim of the regular wheel so as to provide additional rigidity to the assembly of the emergency and regular wheels and to relieve the bolts securing the inner disc 18 to the regular wheel from all radial loads.

The second portion 26 of the inner disc 18 comprises a U-shaped annular ring the legs of which are turned outwardly and encompass the inner edge of outer disc 16. The inner edge of outer disc 16 is adapted to slide inside the U-shaped annular ring 26.

It will be noted that the inner portion of outer disc 16 is at an angle with respect to the outer portion thereof carrying the tire. Such inner portion of the outer disc is disposed at an angle with respect to the outer portion, so that, in the first phase of assembly of the emergency wheel to the regular wheel, it will increase the inclination of the outer disc with respect to the regular wheel. The angle of inclination of the inner portion of the outer disc with respect to the outer portion thereof is equal to the angle of inclination of the second portion 26 of the inner disc with respect to the first portion 24 thereof. In the first phase of assembly of the emergency wheel on the regular wheel, the two angles are added but, in the second phase of assembly, after a relative movement of 180° as it will be described later on, the two angles will cancel each other and render the outer portion of the outer disc parallel to the regular wheel.

The inner disc 18 is rotatable with respect to outer disc 20, or vice versa, during installation of the emergency wheel but, as it will be described later on, they must be locked with respect to each other when they have shifted relatively to a position wherein the emergency wheel is concentric with and parallel to the regular wheel. The means for locking the discs together, as illustrated in FIGS. 1 to 4, include a locking device 32 comprising two latches 34 and 36 which are biased in a locking position by springs 38 and 40 respectively. The outer leg 42 of U-shaped annular ring 26 has a slot 44 therein into which latch 34 falls for locking the inner disc 18 with respect to outer disc 16.

A rotatable ring 46 is located within the U-shaped ring 26 between leg 42 thereof and outer disc 16. Leg 42 and rotatable ring 46 have wedging portions 48 facing each other and adapted to clamp outer disc 16 against the other leg 50 of the U-shaped ring 26. Such wedging portions also cooperate for pushing the emergency wheel against the punctured tire of the regular wheel so as to reduce the axial space taken by the assembly of the emergency and regular wheels so as to permit the use of the emergency wheel with vehicles having a minimum clearance under the fender thereof. Rotatable ring 46 has slots 52 therein adapted to be engaged by latch 36 to lock ring 46 in position as it will be described more fully in a later part of the description.

Referring now to FIGS. 5 and 6, there is shown an alternative embodiment of the invention which comprises substantially the same elements as illustrated in FIGS. 1 and 2 and identified by the same reference numerals except for the means for attaching the inner disc to the regular wheel, and for the means for locking the inner disc with respect to the outer disc when such discs are shifted relatively to a position in which the emergency wheel is concentric with and parallel to the regular wheel.

The means for attaching the emergency wheel to the regular wheel comprises a bar member 54 diagonally secured by welding or otherwise across U-shaped ring 26, a fork member 56 the ends 58 of which engage corresponding slots provided in the body of the regular wheel, and a screw 60 threadably mounted in bar member 54 and rotatably attached to fork member 56. After assembly of the fork member 56 onto the regular wheel, the screw 60 may be tightened to secure the inner rim to the regular wheel and, at the same time, push the tire of the regular wheel so as to reduce the axial space taken by the assembly of the emergency and regular wheels as mentioned previously.

In order to prevent any rotational displacement of the inner disc with respect to the rim of the regular wheel, a number of slots 62 are provided in annular ring 30, such slots engaging corresponding pins 64 which may be provided in the rim of the regular wheel. The same slots 62 may be used for lodging the air valve 66 of the regular wheel.

The emergency wheel of FIGS. 5 and 6 is equipped with a simple locking device 70 instead of the locking device 32 of the emergency wheel of FIGS. 1 and 2. In addition, U-shaped annular ring 26 does not carry any clamping rings and wedging portions since the axial displacement of the emergency wheel is carried out by the means for securing the inner disc 18 to the regular wheel. Consequently, the two legs 42 and 50 of U-shaped ring 26 are only spaced enough to slidably engage the inner edge of outer disc 16.

Locking device 70 is secured to annular ring 30 and comprises a latch 72 biased by a spring 74. Latch 72 is adapted to engage a slot in the inner edge of outer disc 16 when the inner and outer discs are positioned in such a way that the emergency wheel is concentric with the regular wheel.

The operation of the emergency wheel of FIGS. 1 and 2 and FIGS. 5 and 6 is as follows:

Before securing the inner disc 18 of the emergency wheel to the regular wheel, the portion 24 of such inner disc 18 is positioned in such a way that its central axis is vertically below the central axis of portion 26 of the same inner disc, as illustrated in FIG. 5, so as to be able to stand the emergency wheel beside the regular wheel, the axis of which is lowered because of the punctured tire, without having to jack the vehicle. In addition, the angle of the U-shaped ring 26 with respect to portion 24 of the inner disc is added to the angle of the inner portion of the outer disc with respect to the outer portion thereof and permits an adequate inclination of the emergency wheel with respect to the regular wheel, thus permitting the upper portion of the emergency wheel to clear the fender apron and preventing the portion of the emergency wheel which is to contact the ground from bearing on the flattened portion of the punctured tire.

When the emergency wheel is secured to the regular wheel, the vehicle is started and the relative movement between the outer and inner discs 16 and 18 will bring the central axis of portion 24 of inner disc 18 to a position vertically above the central axis of U-shaped ring 26 after a relative movement of 180°, as illustrated in FIGS. 2 and 6, wherein the emergency wheel is concentric with the standard wheel. In addition, the angle of portion 26 with respect to portion 24 of the inner disc will be cancelled by the angle of the inner portion of outer disc 16 with respect to the outer portion thereof, thereby rendering the emergency wheel parallel to the regular wheel. At such a position, the locking devices 32 or 70 lock the outer disc 16 with respect to the inner disc 18. The vehicle may then ride on the emergency wheel.

The emergency wheel may be used on the front or back wheels of a normal vehicle (that is one with rear power drive). When used on a back wheel the drive shaft of the vehicle will rotate the inner disc 18. When used on a front wheel, ground friction will rotate the outer disc 16 so as to provide the required relative movement between the two discs.

In the fully assembled position, the emergency wheel presses the punctured tire in the axial direction as illustrated in FIGS. 2 and 6. The amount of axial displacement is determined, in FIGS. 5 and 6, by the structure of the emergency wheel and by the means for securing the inner disc 18 to the regular wheel. However, in the emergency wheel of FIGS. 1 and 2, the amount of displacement is provided by the structure of the emergency wheel and by the wedging portions 48 of leg 42 of U-shaped ring 26 and ring 46. Referring to FIGS. 8 to 10, it will be seen that, after attachment of the emergency wheel to the regular wheel, the mating surfaces of leg 42 and ring 46 are in full contact with each other due to the pressure exerted by the punctured tire on the emergency wheel. It is to be understood that such is provided for facilitating the assembly of the emergency wheel. Upon movement of the vehicle, or rotation of the drive shaft of the vehicle, the relative movement between the outer and inner discs 16 and 18 will first cause the leg 42 to move ring 46 until latch 36 falls into slot 52 thus locking ring 46 in position. Continued movement of leg 42 will cause the wedging portions 48 to push outer disc 16 against leg 50 of U-shaped ring 26. Finally, latch 34 will fall into slot 44 and lock the two discs 16 and 18 together. It is to be understood that the inward movement of outer disc 16 will push the emergency wheel against the regular wheel.

It is to be understood that modifications may be made to the structure of the emergency wheel disclosed without departing from the scope of the invention. For example, discs 16 and 18 could be corrugated for additional strength and could also be provided with holes to reduce the weight thereof. In addition, the means for attaching the inner disc to the regular wheel as well as the locking devices for locking the inner and outer discs could be easily modified.

Although the emergency wheel disclosed comprises two discs which are concentrically and obliquely disposed with respect to each other, it is to be understood that the invention also intends to cover an emergency wheel having two discs which are concentrically disposed with respect to each other but not obliquely. Such an embodiment of the invention could advantageously be used on certain types of vehicles having sufficient clearance under the fenders thereof to fix the emergency wheel at a suitable distance from the regular wheel.

Furthermore, the U-shaped annular ring 26 permitting the outer disc 16 to rotate with respect to the inner disc 18 could form part of the inner edge of the outer disc and its mating portion be the outer edge of the inner disc.

Finally, the whole assembly could be statically and dynamically balanced by using balancing weights or by partially changing the shape of some of the parts of the emergency wheel.

I claim:

1. An emergency wheel for use with the regular wheel of a vehicle when the tire carried by the rim of the regular wheel is punctured, comprising:
   a. an outer disc carrying a tire;
   b. an inner disc adapted for concentric attachment to the regular wheel of the vehicle, both discs being rotatably joined by excentrically disposed mating portions causing the outer disc to shift from a position excentric with respect to the regular wheel to a position concentric thereto when said discs are rotated with respect to each other, the mating portions of said disc being also obliquely disposed with respect to each disc thus causing the outer disc to shift from a position oblique with respect to the regular wheel to a position parallel to the regular wheel when the discs are rotated with respect to each other; and
   c. means for securing said inner disc with respect to said outer disc when shifted to said concentric position.

2. An emergency wheel as defined in claim 1 wherein said inner disc comprises two eccentric portions disposed at an angle with respect to each other, the first one of which includes means for securing the inner disc to the standard wheel and the second one of which is adapted to rotate within said outer disc.

3. An emergency wheel as defined in claim 2, wherein said outer disc comprises two eccentric portions, the first one of which carries said tire and the second one of which forms one of the mating portions of said discs, said second portion of said outer disc being disposed at an angle with respect to the first portion thereof, so that, in the first phase of assembly of the emergency wheel on the regular wheel, the angles of the respective portions of the inner and outer discs add each other to increase the inclination of the outer disc with respect to the regular wheel, while in the second phase of assembly, after a relative rotation of 180° of the discs, the angles of the respective portions of the discs cancel each other to bring the emergency wheel in parallel relationship with the regular wheel.

4. An emergency wheel as defined in claim 3, wherein the second portion of said inner disc comprises a U-shaped annular ring the legs of which are adapted to encompass the inner edge of said outer disc, said U-shaped annular ring permitting access to the means for securing the inner disc to the regular wheel and the angle of said U-shaped annular ring being such that, in the first phase of assembly, the lower portion of the emergency wheel protrude outwardly to clear the flattened portion of the punctured tire, and, after the relative rotation of 180°, the emergency wheel completely encircles the rim of the regular wheel.

5. An emergency wheel as defined in claim 4, further comprising a bar member secured to said U-shaped annular ring, a fork member adapted to be attached to the rim of said regular wheel and a screw threadably mounted in said bar member and rotatably attached to said fork member for securing said inner disc to said regular wheel and, at the same time, push the punctured tire in the axial direction so as to reduce the axial space taken by the assembly of the emergency and regular wheels.

6. An emergency wheel as defined in claim 4, wherein said means for securing said inner disc with respect to said outer disc when shifted to said concentric and parallel position comprises a locking device secured to one of said discs and an indexing means located on the other disc.

7. An emergency wheel as defined in claim 6, wherein said locking device is secured to said inner disc and said indexing means is a slot located at a predetermined location on the edge of said outer disc.

8. An emergency wheel as defined in claim 6, wherein said locking device is located on said outer disc and said indexing means in a slot located on one leg of said U-shaped annular ring.

9. An emergency wheel as defined in claim 8, wherein said one leg of the U-shaped annular ring includes wedging portions, and further comprising a rotatable ring mounted within said U-shaped annular ring and including wedging portions cooperating with the wedging portions of said one leg of the U-shaped annular ring for pressing the inner edge of said outer disc against the other leg of said U-shaped annular ring when the outer and inner discs are locked in position and, at the same time, push the punctured tire in the axial direction so as to reduce the axial space taken by the assembly of the emergency and regular wheels.

10. An emergency wheel as defined in claim 9, wherein said rotatable ring includes indexing means cooperating with said locking device for locking said rotatable ring in position.

11. An emergency wheel as defined in claim 2, wherein the first portion of said inner disc has holes therein through which may protrude the bolts permitting attachment of the regular wheel of the vehicle for securing said inner disc to the regular wheel.

12. An emergency wheel as defined in claim 2, wherein said first portion further includes an annular ring at the outer edge thereof adapted to contact the rim of the regular wheel to provide additional rigidity to the emergency wheel and to relieve the means for securing the inner disc to the regular wheel from all radial loads.

13. An emergency wheel as defined in claim 12, wherein said annular ring has slots therein adapted to engage corresponding pins in the rim of the regular wheel to secure said inner disc against rotational movement with respect to the rim of the regular wheel.

* * * * *